United States Patent [19]

Corley, Jr.

[11] Patent Number: 4,729,712

[45] Date of Patent: Mar. 8, 1988

[54] VEHICLE LIFT GATE WITH UPRIGHT STORAGE

[76] Inventor: Quentin D. Corley, Jr., 326 S. Rock Island, Dallas, Tex. 75207

[21] Appl. No.: 897,052

[22] Filed: Aug. 15, 1986

[51] Int. Cl.$^4$ ............................................. B60P 1/44
[52] U.S. Cl. .................................. 414/557; 414/557
[58] Field of Search ............... 414/537, 556, 557, 917, 414/538, 571

[56] References Cited

U.S. PATENT DOCUMENTS

| | | | |
|---|---|---|---|
| 2,298,166 | 10/1942 | Richards | 414/557 |
| 2,899,089 | 8/1959 | Ajero | 414/557 |
| 4,005,788 | 2/1977 | Ratliff | 414/557 X |
| 4,111,317 | 9/1978 | Robinson | 414/557 X |
| 4,498,836 | 2/1985 | Love | 414/537 |
| 4,569,626 | 2/1986 | Svanberg | 414/557 |

*Primary Examiner*—Peter A. Aschenbrenner
*Attorney, Agent, or Firm*—Hubbard, Thurman, Turner & Tucker

[57] ABSTRACT

The movement of the lift gate between ground and cargo bed positions is controlled by an attitude control mechanism which effects a change in attitude from horizontal at the bed position to slightly downwardly and rearwardly inclined at the ground position. The platform is raised by lift arms which are coupled to the platform by longitudinally movable pivots which enable the attitude change. The attitude control mechanism includes generally parallel arms pivotally connected to platform uprights; and the platform is pivotally connected about a horizontal axis to the platform uprights. Support arms between the platform and the platform uprights maintain the generally horizontal attitude of the platform. Latch means associated with the platform uprights, latch the uprights and the platform to the cargo bed in the bed position. The platform is swingable upwardly and downwardly relative to its pivot axis for ramping with a loading dock. The platform is swingable upwardly by the lift arms, in the bed position, to swing the platform to a vertical storage position.

16 Claims, 10 Drawing Figures

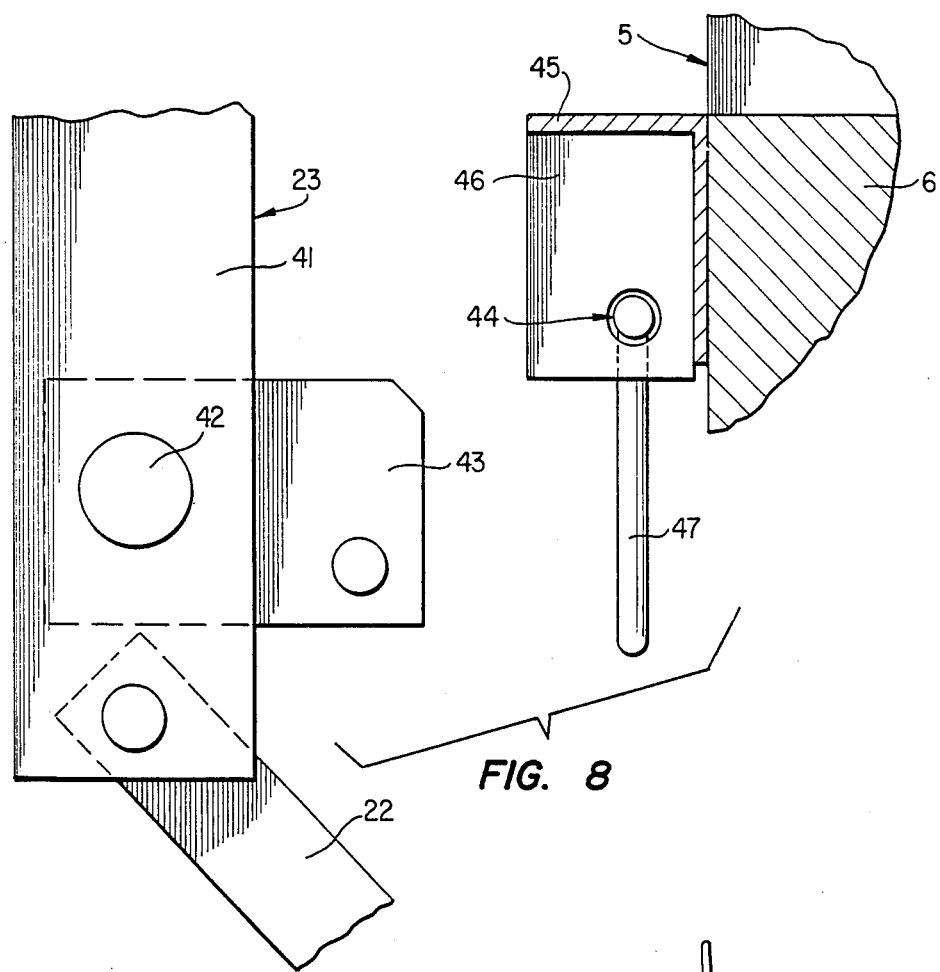
FIG. 8
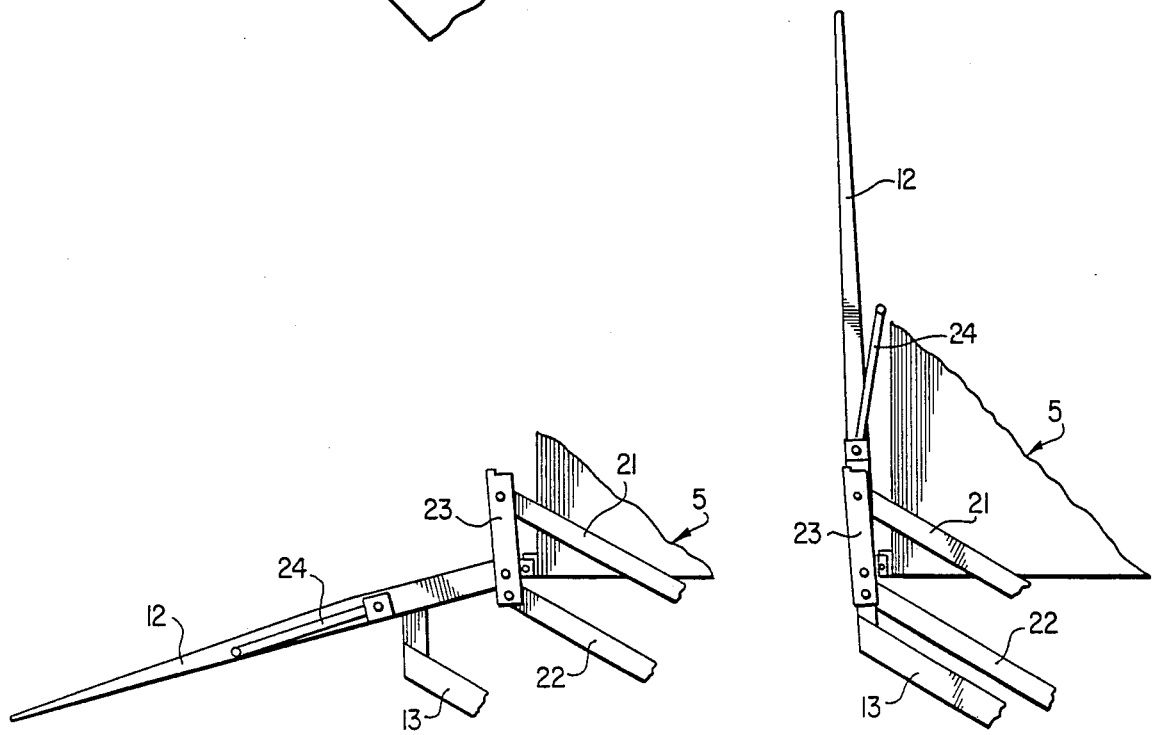
FIG. 9
FIG. 10

VEHICLE LIFT GATE WITH UPRIGHT STORAGE

BACKGROUND AND SUMMARY OF THE INVENTION

This invention relates to a lift gate, for attachment to a cargo vehicle such as a truck or trailer, particularly to the rear loading end of such truck or trailer. More particularly, this invention relates to such lift gate which includes a generally horizontal load platform which is rotated upward to a vertical storage position.

One object of this invention is to provide a lift gate wherein the load platform is designed for ramping with the ground surface or a dock surface to facilitate the loading of cargo with small wheeled dollies and trucks.

Another object of this invention is to provide a lift gate wherein the load platform is moveable between a lower slightly downwardly inclined ground ramping position and a horizontal bed position aligned with the cargo bed of the vehicle.

A further object of this invention is to provide a lift gate wherein the load platform is generally wedge shaped in longitudinal cross section, providing a planar load surface and a thin trailing edge to facilitate ramping with a ground surface or a dock surface.

Still another object of this invention is to provide a lift gate wherein the load platform in its bed position is releaseable from its horizontally supported position to enable it to swing downwardly as well as upwardly from the vehicle bed to function in a dock ramping plate.

A still further object of this invention is to provide a lift gate wherein the load platform is swingable from its horizontal bed position to a vertical storage position through further raising of the lift arms.

Another object of this invention is to provide a lift gate wherein the load platform is supported in a vertical storage position behind the cargo body, and wherein the platform automatically assumes a horizontal bed position aligned with the vehicle cargo bed when swung from the vertical storage position.

A further object of this invention is to provide a lift gate wherein the load platform swings about a common pivot axis to accommodate upward and downward movement of the platform for ramping with a dock surface, and the accommodate movement of the platform between the horizontal bed position and the vertical storage position.

Still another object of this invention is to provide a lift gate including a control mechanism for the platform which latches to the rearward end of the cargo bed, and which provides a horizontal pivot axis for the platform enabling ramping functions of the platform and enabling swinging of the platform to the vertical storage position.

A still further object of this invention is to provide a lift gate including a control mechanism associated with a load platform, which control mechanism together with lift arms enable movement of the platform from an inclined ground ramping position to a horizontal bed position.

These objects are accomplished in a lift gate for attachment to a vehicle having a cargo bed, which lift gate includes a load platform having a leading edge and a trailing edge. An attitude control mechanism for the platform includes a pair of platform uprights which are disposed at opposite sides of the platform adjacent to its leading edge, and a pair of upper and lower arms pivotally connected to each of the platform uprights and to the vehicle, for controlling the attitude of the platform during the raising and lowering thereof between ground and bed positions. A pair of lift arms are oscillatable about a horizontal axis between lower and upper positions. Longitudinally moveable pivot means are mounted on the platform, and the distal ends of the lift arms are pivotally connected to those moveable pivot means. Power means affects the raising of the lift arms from the lower position.

More particularly, the platform is pivotally connected at its leading edge to the lower ends of the platform uprights. Platform support arms are pivotally mounted at opposite sides of the platform rearward from the platform uprights. These arms have catch members at their distal ends and the platform uprights have coacting catch members at their upper ends, which catch members are engageable to support the platform in load carrying attitude relative to the platform uprights.

Still more particularly a latch mechanism latches the attitude control mechanism to the rearward end of the cargo bed, to fix the load platform pivot axis relative to the cargo bed.

The novel features and the advantages of the invention as well as additional objects thereof, will be understood more fully from the following description when read in connection with the accompanying drawings.

DRAWINGS

FIG. 8 is a detail view of the latch mechanism for the platform uprights;

FIG. 9 is a side view of the lift gate, with the platform inclined downwardly in the bed position; and FIG. 10 is a side view of the lift gate, with the platform in the upright storge position.

DESCRIPTION OF THE PREFERRED EMBODIMENT

Figure 1:
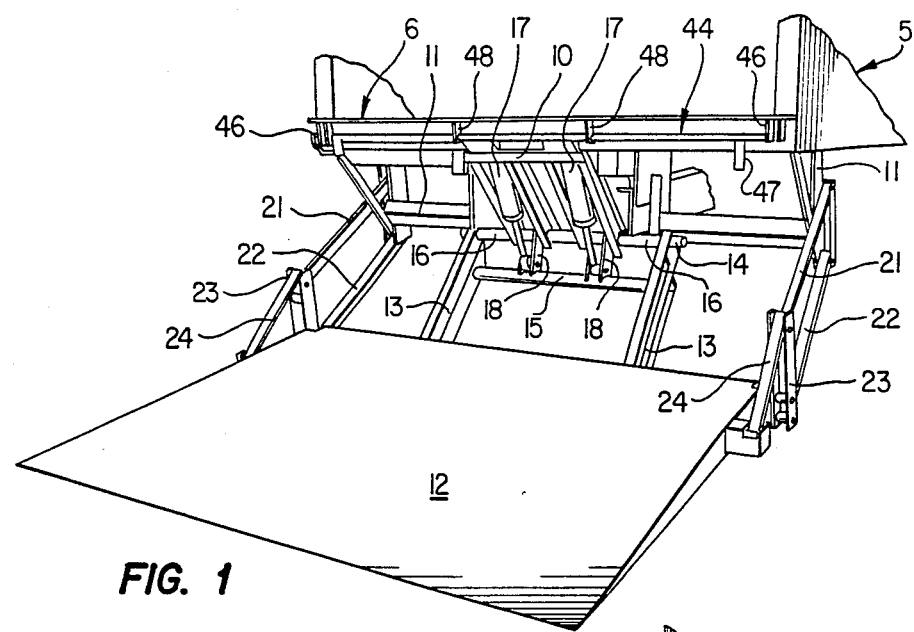
FIG. 1 is a perspective view of a lift gate according to the invention, with the gate in the ground ramping position.

FIG. 1 of the drawing is an overall perspective view of a lift gate assembly according to the invention, as mounted on the rear end of a vehicle such as a cargo truck 5 having a cargo body including a cargo bed 6 mounted on the truck frame.

The lift gate assembly includes a cylinder tower 10 and other support structure 11 which are secured to both the frame and the bed of the truck 5 by welding for example. A load platform 12 is raised and lowered by a lift arm assembly including a pair of lift arms 13 mounted on an interconnecting pivot shaft 14, and braced by an interconnecting torsion shaft 15. The pivot shaft 14 is journaled in bearing sleeves 16 which are secured to the above mentioned cylinder tower and support structure. A pair of power cylinders 17 include cylinder bodies which are pivotally mounted at the upper end of the cylinder tower, with the cylinder rods being pivotally connected to brackets 18 connected between the pivot shaft and the torsion shaft. The cylinder rods are extended to position the platform in the lower ground ramping position illustrated in FIG. 1, and are contracted for other functions of the lift gate to be described.

The platform attitude is controlled by an attitude control mechanism which consists of a pair of upper and lower generally parallel arms 21 and 22 respectively, platform uprights 23 which are pivotally connected to the platform as will be described, and support arms 24. The upper and lower arms 21 and 22 are pivotally attached at their forward ends to the support structure 11 which is rigidly attached to the truck 5. The rearward ends of the arms are pivotally attached to the platform uprights 23 to maintain those uprights in a generally vertical attitude. The lower ends of the platform uprights are pivotally attached to the forward edge of the platform; and the lower ends of the support arms 24 are pivotally attached to the platform rearward of the platform upright pivots. The support arms are latched to the platform uprights (as will be described subsequently) to support the platform in a generally horizontal attitude relative to the platform uprights.

The pivot points for the upper and lower arms 21 and 22 are so related that the attitude of the platform 12 will change between the ground ramping position and the upper bed position. In the bed position, the load surface of the platform will be horizontal and generally coplanar with the truck bed. In the ground ramping position, on the other hand, the load surface of the platform will be inclined slightly downwardly so that the rearward edge of the platform ramps with the ground surface.

Figure 2:
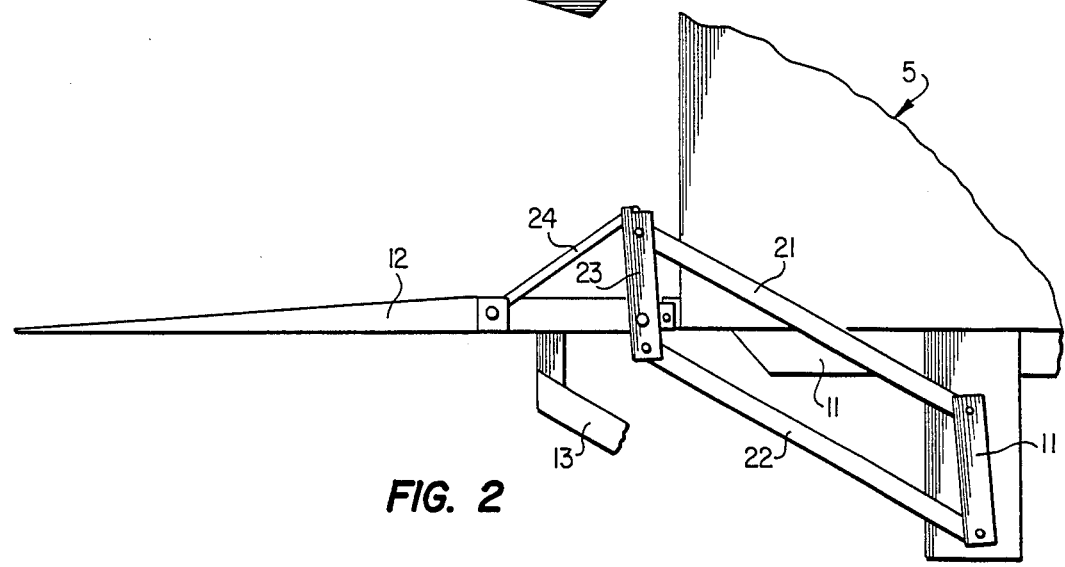
FIG. 2 is a side view of the lift gate of FIG. 1, with the load platform in the horizontal bed position.

As best seen in FIG. 2, the platform is generally wedge-shaped in longitudinal cross-section, with the rearward edge of the platform being thin to facilitate the ramping with the ground surface and with other surfaces as will be described. The thin rearward edge of the platform coupled with the planar load surface facilitates the transfer of cargo using small wheeled dollies or trucks.

Figure 4:
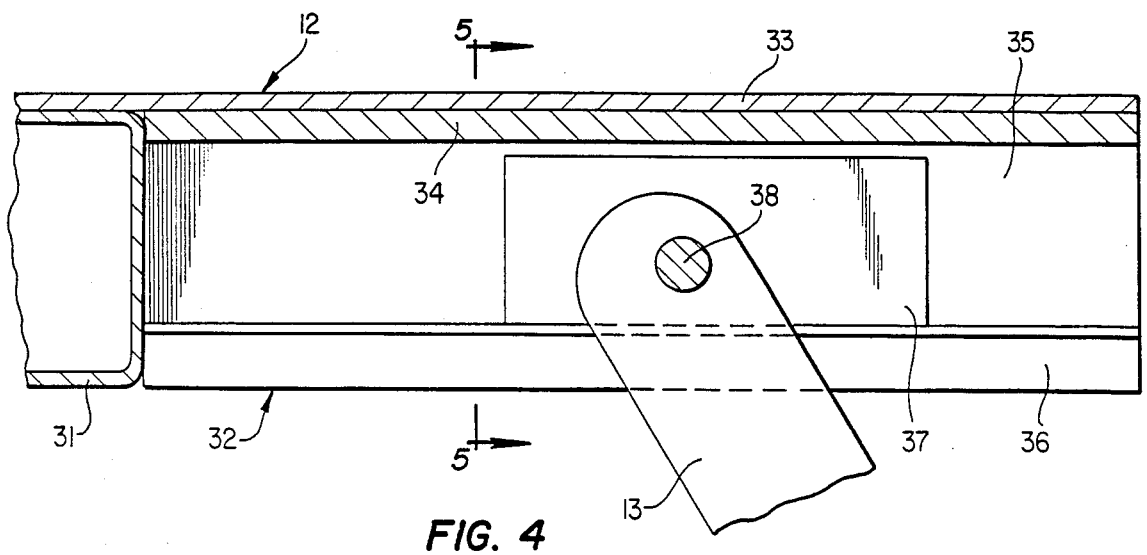
FIG. 4 is a detail view, in longitudinal cross section, of a moving pivot for the platform.
Figure 5:
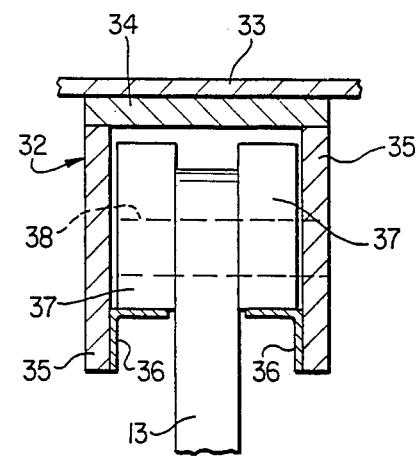
FIG. 5 is a sectional view taken along the line 5—5 of FIG. 4.

In order to accommodate the above described attitude changes of the platform, and other functional movements of the platform to be described, the distal ends of the lift arms are connected to the platform by means of longitudinally movable pivots. The structure of these movable pivots is illustrated in FIGS. 4 and 5 which are fragmentary views of the platform 12. A main platform torsion member 31, in the form of a tubular member, is disposed near the forward edge of the platform. A pair of longitudinal slide housings 32 for the movable pivots are disposed between the torsion member and the forward platform edge, and abut the torsion members. These housings and the torsion member immediately underlie the platform load plate 33. The slide housings each consist of top plate 34, a pair of side plates 35, and a pair of bottom plates 36 in the form of angles supported at the lower edges of the side plates and which are spaced from each other to define a channel for traversal of a lift arm 13. The movable pivot consists of a pair of spaced slide blocks 37 coupled to the intervening distal end of the lift arm 13 by a pivot pin 38; the slide block assembly being confined within the slide housing 32. The slide blocks are preferably fabricated from some suitable material such as polyvinylchloride. The center of mass of the platform 12 and its associated attitude control mechanism which are raised and lowered by the lift arms, is well rearward of the rearward most position of the lift arm pivots, so that the platform attitude established by the support arms 24 will be maintained.

Figure 3:
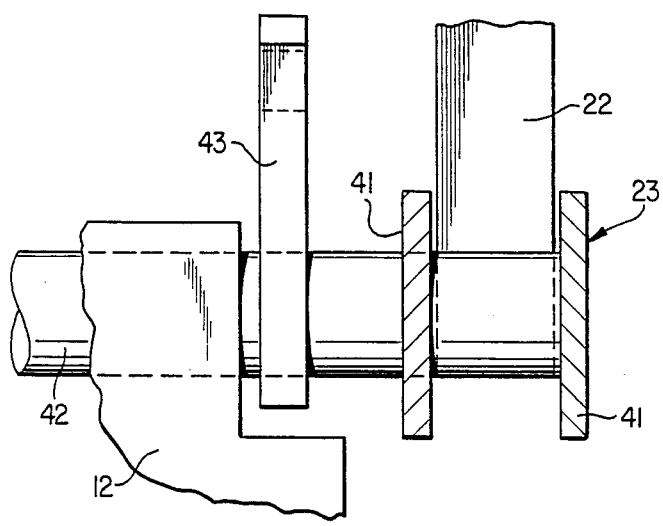
FIG. 3 is a fragmentary detail view of the platform and associated mechanism.

FIG. 3 is a fragmentary detail view, looking from the top of the platform 12 illustrating the pivot mounting of the platform relative to the platform uprights 23. As seen in the drawings, each of the platform uprights 23 consist of a pair of spaced plates 41 supporting pivot pins for the upper and lower arms 21 and 22 of the attitude control mechanism, which arms are received between the plates 41. A platform pivot stubshaft 42 is anchored at one end in the plates 41, adjacent to the lower end of the platform upright, and extends transversely from the upright into journal structures of the platform parallel with and adjacent to the forward edge of the platform. A latching ear 43 is rigidly mounted on the shaft 42, adjacent to the platform upright 23, and projects forwardly (transversely of the upright 23) to function as part of a latch mechanism for latching the platform to the truck bed 6 in the bed position of the platform. This latching mechanism includes a slide bolt mechanism 44, best seen in FIGS. 1 and 8, which is mounted on the rearward end of the truck bed in association with a reinforcing plate 45. The reinforcing plate is in the form of a structural angle secured in any desired manner to the rearward edge of the truck bed, and oriented to define upper and forward stops. Two pairs of ears 46 are mounted on the reinforcing plate at opposite ends thereof, adjacent to the sides of the truck bed, and define recesses for receiving the platform ears 43. The bed ears 46 and the platform ears 43 are provided with transverse holes which are aligned with each other when the platform ears are suitably received within the recesses, to receive bolts of the laterally movable slide bolt mechanism which then locks the platform to the truck bed. The slide bolt mechanism 44 includes an operating handle 47; and this mechanism is supported in part by the bed ears 46 and by additional brackets 48 mounted on the reinforcing plate 45. The platform ears 43 are configured to abut both the upper stop and forward stop defined by the reinforcing plate 45 to align the holes of the respective ears 43 and 46 to enable latching by the slide bolt mechanism.

With the platform so latched to the truck bed, the platform pivot axis, defined by the stubshafts 42, is fixed relative to the truck bed.

Figure 6:
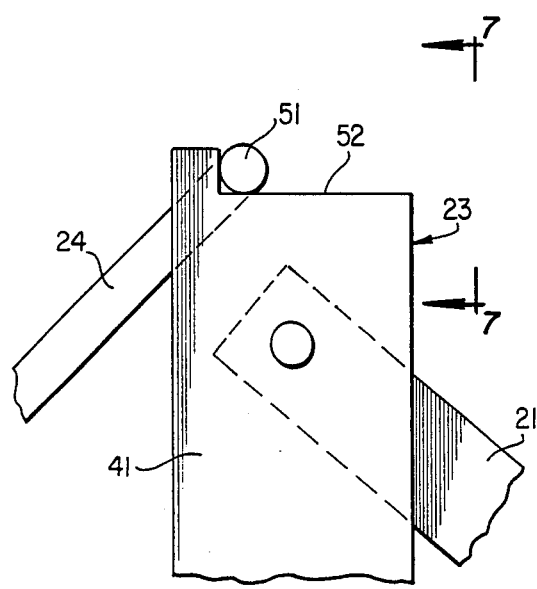
FIG. 6 is a fragmentary side view of a platform upright catch mechanism.
Figure 7:
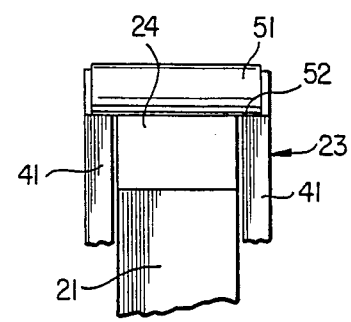
FIG. 7 is a view taken from the plane 7—7 of FIG. 6.

As best seen in FIGS. 6 and 7, the platform uprights 23 and support arms 24 include coacting catch means for limiting the rearward and downward movement of the distal ends of the support arms. As seen in these figures, the distal ends of the support arms are disposed between the plates 41 of the respective uprights 23, whereby these arms are confined against lateral movement relative to the uprights. Transverse pins 51 are mounted at the distal ends of the suppport arms, and project laterally therefrom to be received in recesses 52 formed at the upper ends of the plates 41. With the pins engaged in the notches, the platform 12 is maintained with its load surface generally coplanar with the truck bed surface, when the platform is in the bed position. The recesses 52 are configured that, should the platform be raised or pivoted upward relative to the pivot shafts 42, the support arm pins 51 will simply disengage from the recesses 52 and allow that movement. During such movement, the support arms will remain confined between the plates 41 of the platform upright, so that when the platform is again lowered, the recesses 52 will automatically catch the pins 51.

When the truck is backed up to a loading dock, the platform 12 may be used as a dock plate; and the thin rearward edge of the platform facilitates ramping association with the dock loading surface. Should the dock be slightly higher than the truck bed at the time of truck approach, the rearward end of the platform may be raised manually to position that rearward edge in association with the edge of the loading dock. Should the truck bed be slightly higher than the dock surface at the time of truck approach, the platform may be released from the platform uprights to allow the platform to swing downward to ramp with the dock surface. This release of the platform is accomplished merely by manual lifting of the rearward end of the platform and swinging the support arms 24 rearward and out of engagement with the recesses 52 of the platform uprights. Both the upward swinging and the downward swinging of the platform, to accommodate dock ramping, will be permitted by the sliding pivots of the lift arms.

Preferably the two support arms 24 are interconnected by a transverse shaft so that both support arms may be swung simultaneously from either side of the platform to disengage the arms from the respective platform uprights. The downward ramping of the platform relative to a loading dock is illustrated in FIG. 9; and it will be seen that the support arms are supported by their pivot mounting generally parallel with the platform, out of the way so as not to present a hazard to working personnel.

The above described platform design allows for the vertical storage of the platform 12, as illustrated in FIG. 10; and the swinging of the platform to the vertical storage position is accomplished by further raising of the lift arms. This further raising of the lift arms, coacting with the fixed pivot mounting for the platform relative to the truck bed, effects the upward swinging of the platform by means of the described movable lift arm pivots. The power cylinders of the lift arm mechanism will maintain the platform in that upright position during truck transit. Safety chains are also attached. The above described catch mechanism of the platform uprights and associated support arms allows this upward swinging; and when it is desired to lower the platform to the horizontal bed position, this is controlled by the power cylinders and the platform uprights will automatically catch the lift arm pins to arrest that downward swinging of the platform at the horizontal bed position.

FEATURES AND ADVANTAGES

What has been described is a novel lift gate structure which facilitates a number of functions for the lift gate.

An important feature of the invention is the attitude control mechanism which includes generally parallel arms, in association with lift arms pivotally connected to the platform by means of longitudinally movable pivots. This support and lift structure for the lift gate platform enables the attitude of the platform to change from a generally horizontal upper bed position, co-planar with the truck bed, to a ramping ground position wherein the planar load surface of the platform is inclined relative to the ground surface.

An ancillary feature and advantage of the lift gate is that the platform is generally wedge-shaped in transverse cross-section, having a narrow rearward edge to facilitate that ramping with the ground surface or with a loading dock surface to thereby facilitate use of the lift gate with small-wheeled loading vehicles.

Another feature and advantage of the invention is the latch mechanism for latching the platform to the truck bed, in the bed position, and providing a single pivot axis for the platform to allow upper or downward inclining of the platform to function as a ramping dock plate, and to allow swinging of the platform to the vertical storage position. Both functions are accomplished by the coaction of the single pivot axis and the provision of the movable pivots coupling the platform and lift arms.

A further feature of the invention is the coacting catch means provided by the platform uprights and the support arms which provide for automatic catching of the platform in the horizontal bed position following lowering of the platform from the storage position, and which provide for ready release to allow downward ramping of the platform at the bed position to function as a dock plate.

Still another feature and advantage of the invention is the power raising of the platform to the storage position by means of the same power mechanism for moving the platform between the bed and ground positions.

While the preferred embodiment of the invention has been illustrated and described, it will be understood by those skilled in the art that changes and modifications may be resorted to without departing from the spirit and scope of the invention.

What is claimed is:

1. A lift gate for attachment to a vehicle having a cargo bed comprising:
    a load platform having a leading edge adapted to confront the end plane of the cargo bed and a trailing edge at the distal end of said platform from said leading edge;
    an attitude control mechanism for said platform comprising a pair of platform upright members pivotally connected to opposite sides of said platform adjacent to said leading edge, and a pair of spaced apart upper and lower arms pivotally connected to each of said platform upright members and to said vehicle and cooperating with said upright members for controlling the attitude of said platform during the raising and lowering thereof between ground and bed positions;
    a pair of lift arms adapted to be pivotally supported for oscillation between lower and upper positions, about a horizontal axis disposed under said vehicle bed;
    longitudinally movable first pivot means mounted on said platform; the distal ends of said lift arms being pivotally connected to said movable first pivot means and operative when oscillated to effect longitudinal displacement of said first pivot means; and
    power means operative for effecting the raising of said lift arms from said lower position.

2. A lift gate as set forth in claim 1 including
means for latching said attitude control mechanism to the edge of the vehicle cargo bed, in the bed position of said platform.

3. A lift gate as set forth in claim 2
said latching means including: rearward projecting bed ears adapted to be mounted at the rearward edge of said cargo bed adjacent to opposite sides thereof; forward projecting platform ears mounted on said platform uprights for coaction with respective bed ears; said ears having transverse holes; a slide bolt mechanism adapted to be mounted on the rearward end of said cargo bed, to selectively engage transverse bolts with the bores of said coacting ears.

4. A lift gate as set forth in claim 1 including second pivot means comprising said pivotal connection between said platform and said upright members and located at the lower ends of said platform upright members;

said arms of said attitude control mechanism being pivotally connected to said platform upright members for maintaining said platform upright members generally vertical during the raising and lowering of said platform;

a pair of platform support members pivotally mounted at opposite sides of said platform, rearward from said platform upright members; said platform upright members and said support members having coacting catch means operable in a catch relation for limiting relative movement of said support members to maintain said platform generally horizontal relative to said generally vertical platform upright members.

5. A lift gate as set forth in claim 4 in which said catch means is disengageable from said catch relation to enable a change in attitude of said platform from horizontal at said bed position, to slightly rearwardly and downwardly inclined at said ground position.

6. A lift gate as set forth in claim 4 including
said platform upright members each having one cooperable element of said catch means at the upper ends thereof; and
and support members each having the other cooperable element of said catch means at the distal ends thereof, for coaction with said one cooperable element to limit rearward movement of said support members relative to said platform upright members.

7. A lift gate as set forth in claim 6 including
said support members comprising elongated members;
said platform upright members having means for guiding sliding movement of said support members relative thereto, to effect the engagement of said coacting catch means.

8. A lift gate as set forth in claim 7 including
said platform being swingable upward relative to said platform upright members; said support members being slideable relative to said platform upright members to accommodate said upward swinging of said platform; and said upward swinging being enabled by said movable first pivot means for said platform lift arms.

9. A lift gate as set forth in claim 7 including
said platform being swingable about said second pivot means by said lift arms, at said bed position, to a generally vertical storage position relative to said generally vertical platform upright members; said movement of said platform being enabled by said movable first pivot means for said platform lift arms.

10. A lift gate as set forth in claim 6 including
said support member catch means other element being disengageable from said platform upright member catch means one element to allow a downward swing of said platform relative to said attitude control mechanism;
said downward swing of said platform being enabled by said movable first pivot means for said platform lift arms.

11. A lift gate as set forth in claim 10 including
stop means on said platform limiting rearward movement of said movable first pivot means, thereby limiting said downward swing of said platform relative to said attitude control mechanism.

12. A lift gate as set forth in claim 10 including
said platform support members being rigidly connected by a transverse member for unitary pivoting movement thereof.

13. A lift gate as set forth in claim 1 including
said platform being generally wedge-shaped in longitudinal cross section, providing a generally planar load surface and a thin trailing edge, to facilitate ramping with a ground surface or a dock surface.

14. A lift gate as set forth in claim 1 including
said movable first pivot means of said platform being disposed that the center of mass of said platform and associated attitude control mechanism, which are raised and lowered by said lift arms, is rearward of the rearward most movable pivot point.

15. A lift gate as set forth in claim 7 including
said platform being swingable upward relative to said platform upright members; said support members being slideable relative to said platform upright members to accommodate said upward swinging of said platform; and said attitude mechanism is operative to define the fulcrum for rotation of said platform between the bed position and the upright position.

16. A lift gate as set forth in claim 4 in which said attitude control mechanism at each side of said platform comprises a trapezoidal linkage assembly.

* * * * *